May 17, 1932.  V. BENDIX  1,858,913
PROPELLER
Filed Oct. 4, 1929
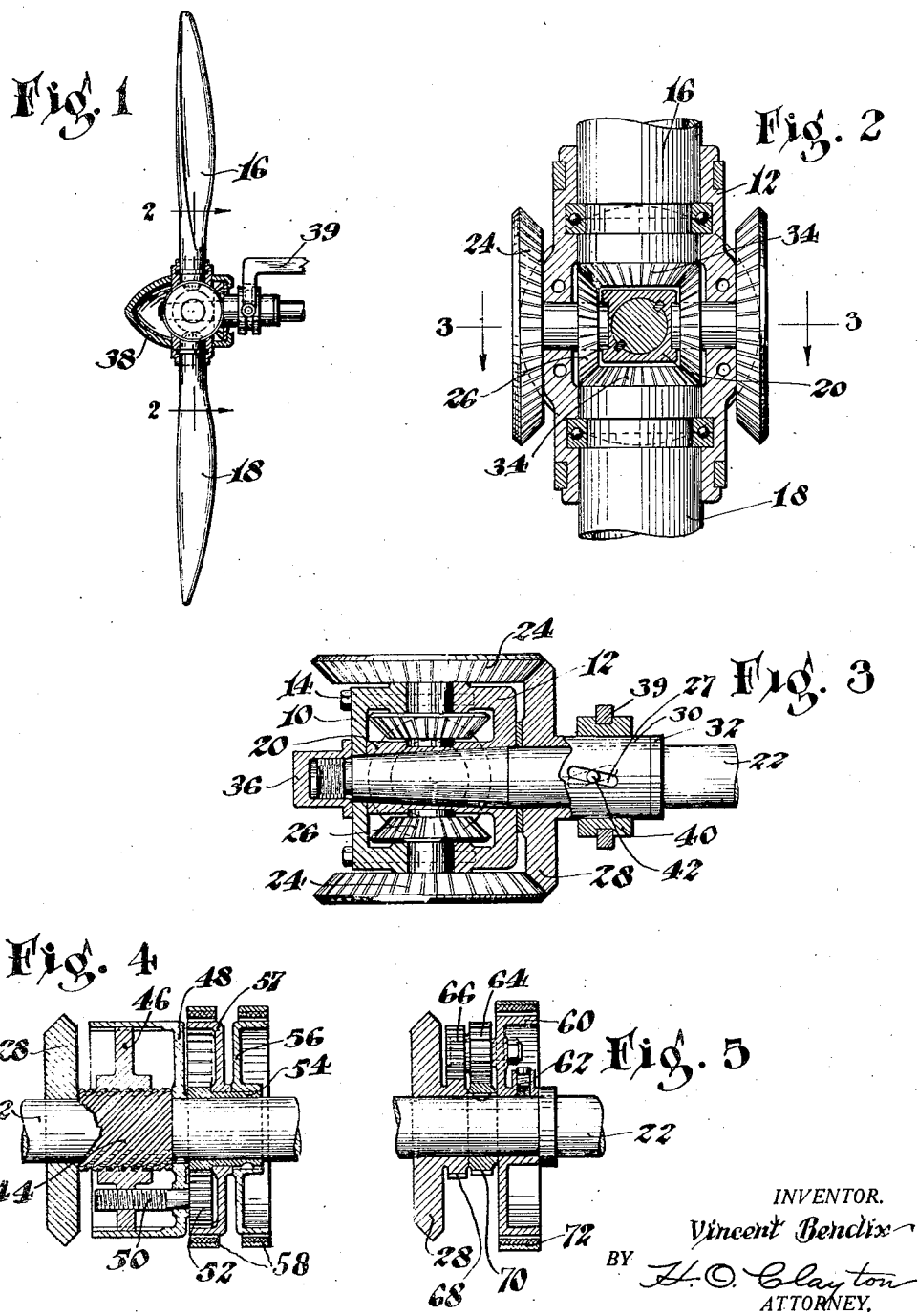
INVENTOR.
Vincent Bendix
BY H. O. Clayton
ATTORNEY.

Patented May 17, 1932

1,858,913

UNITED STATES PATENT OFFICE

VINCENT BENDIX, OF CHICAGO, ILLINOIS, ASSIGNOR TO BENDIX AVIATION CORPORATION, OF SOUTH BEND, INDIANA, A CORPORATION OF DELAWARE

PROPELLER

Application filed October 4, 1929. Serial No. 397,179.

This invention relates to screw propellers and is illustrated as embodied in an aircraft propeller.

In certain classes of air work, it is extremely desirable to be able to vary the pitch or the angle of the blades, while the propeller is running, to thus compensate for different conditions of engine speed or atmospheric density. In other classes of work such as checking the speed of airplanes when landing on comparatively restricted surfaces as, for example, the deck of a ship, it becomes important to completely reverse the propeller blades, thereby changing the direction of thrust and providing, in effect, a brake of the moving blade.

This invention, therefore, relates more particularly to aircraft propellers of that type in which the blades are capable of simultaneous adjustment about their several longitudinal axes in such a manner that the pitch of the blades can be varied at will or their action entirely reversed to any desired degree—all during the continuous operation of the propeller.

To the above end I have provided a very simple, compact, rugged and dynamically balanced control mechanism at the hub of the propeller comprising both power and manually operated means for effecting relative movement between the propeller shaft and parts of the control mechanism altering the angularity or pitch of the propeller blades.

In a preferred embodiment of the hub construction, the stem ends of the blades are adapted to be clamped between longitudinally divided sections of the hub proper, the latter being rigidly secure to the propeller shaft and to each other. A gear structure comprising parts secured to the hub section driving the blades to impart angular movement thereto and driven by gear means sleeved upon and relatively movable with respect to the power shaft, completes, in brief, the control mechanism at the hub. A friction clutch operated power means, including relatively movable sun and planet gears, may be employed to impart relative movement between the aforementioned sleeve and shaft or, in alternative, a pin and slot manually operated mechanism may be employed.

Further objects of the invention, including desirable particular constructions and combinations of parts, will become manifest from the detailed description of the embodiments exemplified in the accompanying drawings, in which:

Figure 1 is a side elevation of a propeller showing partially in section my novel control means at the hub thereof;

Figure 2 is an enlarged section taken on the line 2—2 of Figure 1 through the hub and control structure;

Figure 3 is a partial section taken on the line 3—3 of Figure 2 showing other parts of the control structure;

Figure 4 is a modified form of power operated means for controlling the relative movement of certain of the parts of Figure 3; and Figure 5 discloses a modified form of power operated control mechanism for effecting the same purpose.

Referring to the drawings disclosing in detail the preferred embodiments of my invention, my improved propeller structure comprises a longitudinally divided two-part hub construction comprising relatively long channel-shaped members 10 and 12 detachably secured together as by bolts 14 and adapted to embrace between them the stem ends of propeller blades 16 and 18, as clearly disclosed in Figure 2. Hub part 12 is preferably provided with a central rectangularly shaped boss 20 keyed to the power shaft 22 and socketed on its sides to receive the shank ends of miter or beveled gears 24 and 26, which shank portion is rigidly supported intermediate the gears in the walls of the mating hub portions. The outer and larger of each pair of beveled gears are preferably meshed with a driving miter or beveled gear 28 having a sleeved portion 30 rotatably and telescopingly mounted on the power shaft and abutting a flange portion 32 thereon. The inner and smaller of each pair of beveled gears 26 are preferably arranged to mesh with right-angularly arranged beveled gear portions 34 on the extreme ends of the stems of the blades. This hub and gear construction as described is retained on the end of the power shaft by means of a cap nut 36 threaded on the shaft and abutting the end of the hub. An acorn-shaped nose piece 38 surrounds the major portion of this mechanism, as clearly disclosed in Figure 1.

Relative rotation of the sleeve 30 and its gear 28 with respect to the power shaft may be effected, as disclosed in Figure 3, by a manually operable yoke member 39 slidingly received within a groove in the collar member 40 keyed to the sleeve and shaft by a pin 42 and which pin is adapted to slide within angularly extending slots (preferably about 27°) in the sleeve and shaft respectively.

In order to effect the desired angular adjustment of the blades during flight and with the blades rotating, it is merely necessary to effect, from the cockpit, movement to the yoke 39, thereby moving the collar 40 with its pin in either direction to effect, through the oppositely directed slots, relative movement of the shaft and sleeve. Movement is thus imparted to the gear 28 and, through the gear train 24, 26 and 34, oppositely directed movement to the respective blades is effected.

If desired, relative movement in either direction between the power shaft 22 and gear 28 may be effected, as disclosed in Figure 4, by selectively operable power operated mechanism. As disclosed, gear 28 is provided with a sleeve 44 having a relatively coarse external thread in mesh with the internal threads of a nut member 46 having spokelike arms slidingly keyed in the flange portion of a drum 48. The drum 48, which is preferably keyed to the power shaft, may be provided with one or more shank portions 50 threaded into the aforementioned spoke portions of the nut. Each of the shank portions is provided on its outer end with a spur planet gear 52 in mesh with a sun gear 54 sleeved on the power shaft and having the end portion of its sleeve keyed to a drum member 56. A second clutch drum member 57 provided with gear teeth on the inner side of its flange to provide a sun or ring gear may also be sleeved on the aforementioned sun gear abutting the tooth portion thereof.

In operation of this form of power control means, pilot controlled friction bands 58 are adapted to be contracted upon the flange portions of the drums 56 and 57 to selectively retard one or the other of the same with respect to the power shaft, thereby producing relative rotation between one or the other of these parts and the shaft. This effects a sun-and-planet movement of the gears effecting rotation of the shank screw portions, which in turn serves through the lineal movement of the spoke members of the nut to effect either clockwise or counterclockwise rotative movement to the sleeve 44 and gear 28 to control the blade adjustment.

As disclosed in Figure 5, I have provided a second type of power operated means for effecting, during flight or rather during propeller movement, relative rotation between the driving gear 28 and power shaft 22. In this modification of my invention, a drum-like member 60 is frictionally clamped to the power shaft by means of spring pressed friction members 62. This drum member 60 is provided in its head portion with one or more rotatably mounted spur planet gears 64, each gear having a second gear 66 of lesser diameter mounted thereon. One end of the sleeve of gear 28 is provided with spur gear 68 in mesh with the smaller planet gear 66 and a spur sun gear 70 in abutment with said aforementioned gear 68 and keyed to the shaft is in mesh with the planet gears 64. In both the mechanisms shown in Figures 4 and 5, I prefer two diametrically disposed planet gears to thus provide a balanced couple.

In operation, relative rotation between the drum 60 and power shaft is effected by manually controlled friction clutch band mechanism 72 serving to impede the rotation of the drum relative to the shaft and bodily rotate the planet gears 64 and 66 about the shaft and simultaneously effect rotative movement thereto by virtue of the sun gear 70. The smaller of the planet gears in mesh with the sleeve portion of the drive gear 28 thus serves to rotate the same to effect the desired angular pitch changing adjustment of the blades.

While several illustrative embodiments of the invention have been described in detail, it is not my intention to limit the scope of the invention to those particular embodiments or otherwise than by the terms of the appended claims.

I claim:

1. A propeller structure comprising, a shaft for rotating said propeller, a hub structure rigidly secured to said shaft, axially adjustable blades mounted therein, means for adjusting said blades while the propeller is in motion, said means comprising intermeshing gears mounted on said blades, hub and shaft, together with means for rotating said gear carried by said shaft for imparting movement to said other gears to effect axial adjustment of said blades.

2. A propeller structure comprising, a shaft, a two-part hub structure rigidly secured to said shaft, axially rotatable blades mounted therein, means for axially rotating said blades while the propeller is in motion, said means comprising intermeshing gears mounted on said blades, hub and shaft, together with means carried by said gear on said shaft for imparting movement to said gear on said shaft to effect the desired adjustment.

3. A propeller structure comprising, a shaft for rotating said propeller, a hub structure rigidly secured to said shaft, angularly adjustable blades mounted therein, means for adjusting said blades while the propeller is in motion, said means comprising intermeshing gears mounted on said blades, hub and shaft, together with manually controlled means rigid with said gear on said shaft and adapted to effect relative movement between said intermeshing gears and shaft to effect the adjustment of the blades.

4. A propeller structure comprising, a shaft for rotating said propeller, a hub structure rigidly secured to said shaft, angularly adjustable blades mounted therein, means for adjusting said blades while the propeller is in motion, said means comprising intermeshing gears mounted on said blades, hub and shaft, together with friction controlled means mounted on said shaft and adapted to effect relative movement between said intermeshing gears and shaft to effect the adjustment of the blades.

5. Propeller mechanism comprising, a shaft for rotating said propeller, a hub portion keyed to said shaft, angularly adustable blades mounted therein, gear mechanism mounted on said blades, hub and shaft for changing the pitch of said blades, together with manually controlled power means for effecting said change of pitch, said latter means comprising selectively operable clutch mechanisms adapted to impart through said gear mechanism pitch adjusting movement to said blades.

6. Propeller mechanism comprising, a shaft for rotating said propeller, a two-part hub portion keyed to said shaft, axially rotatable blades mounted therein, gear mechanism mounted on said blades, hub and shaft for causing axial rotation of said blades to change the pitch thereof, and manually controlled power means for effecting said axial rotation, said latter means comprising friction controlled means.

7. Propeller mechanism comprising, a shaft for rotating said propeller, a two-part hub portion keyed to said shaft, axially rotatable blades mounted therein, gear mechanism mounted on said blades, hub and shaft for causing axial rotation of said blades to change the pitch thereof, together with manually controlled power means for effecting said axial rotation, said latter means comprising a part keyed to said shaft, a second part sleeved and rotatably mounted on said shaft and having gear means thereon co-operating with said first-mentioned part, and friction means contacting one of said parts to effect relative movement between one of said parts and the shaft.

8. Propeller mechanism comprising, a shaft for rotating said propeller, a two-part hub portion connected to said shaft, axially rotatable blades mounted therein, gear mechanism mounted on said blades, hub and shaft for imparting axial rotation to said blades, and manually controlled power means for effecting said axial rotation, said latter means comprising a nut threadedly mounted on said gear mounted on said shaft, and means for imparting lineal movement to said nut with respect to said shaft to effect rotation of said last-mentioned gear to effect the desired blade adjustment.

9. Control mechanism for a propeller comprising, a rotatable propeller supporting power shaft, and a propeller operating gear member sleeved on said shaft, said member being provided with external threads meshing with a nut threaded thereon.

10. Control mechanism for a propeller comprising, a rotatable propeller supporting power shaft, and a propeller operating gear member sleeved on said shaft, said member being provided with external threads meshing with a nut threaded thereon, together with means for effecting lineal but nonrotative movement of said nut.

11. Control mechanism for a propeller comprising, a rotatable propeller supporting power shaft, a gear member sleeved on said shaft, said gear member being provided with a sleeve having external threads, a nut threaded thereon, and operating means therefor comprising a sun gear and planetary gears operated thereby for effecting lineal movement of said nut.

12. Control mechanism for a propeller comprising, a rotatable propeller supporting power shaft, a gear member sleeved on said shaft, said gear member being provided with a sleeve having external threads, a nut threaded thereon, and friction controlled means deriving power from said shaft, said means being selectively operative to move said nut relatively to said sleeve in a longitudinal direction to effect rotation of said gear member.

13. Control mechanism for a propeller comprising, a rotatable propeller supporting power shaft, a propeller operating gear member sleeved on said shaft, said gear member being provided at one of its ends with a spur gear.

14. Control mechanism for a propeller comprising, a rotatable propeller supporting power shaft, a sun gear on said shaft, a propeller operating gear member sleeved on said shaft and provided with a spur gear, and power operated means comprising at least one planetary gear meshing with said sun gear, and a second planetary gear meshing with said spur gear and operative to rotate said first-mentioned gear member.

15. A propeller having blades, a shaft for rotating said propeller, a hub carried by said shaft for receiving said blades, gear means carried by said shaft, blades and hub, and means for rotating said shaft-carried gear to thereby cause rotation of said hub-carried gears and said blade-carried gears to effect rotation of said blades in said hub.

16. A propeller having blades, a shaft for rotating said propeller, a hub carried by said shaft for receiving said blades, gear means carried by said shaft, said hub and said blades, means for causing relative rotation between said shaft-carried gear and said shaft to thereby cause rotation of said hub-carried gears and said blade-carried gears, to thereby cause rotation of the blades in the hub.

17. In a device of the class described, a propeller having blades, a hub adapted to receive said blades, a shaft for rotating said hub, and means for rotating said blades in said hub including a gear on said shaft and formed with an externally threaded extension, a nut member threaded on said extension, a drum keyed to said shaft and operatively connected to said nut member, and means for moving said nut member longitudinally of said shaft to cause rotation of said gear.

18. In a propeller construction, a shaft for rotating said propeller, a hub for receiving the blades of said propeller, means for rotating said blades about their longitudinal axes comprising intermeshing gear means mounted on said blades, said hub and said shaft, means for rotating said gear on said shaft relatively to said shaft comprising a nut member having a threaded connection to said gear on said shaft and means for moving said nut member longitudinally of the shaft.

19. In a propeller construction, a shaft for rotating said propeller, a hub for receiving the blades of said propeller, means for rotating said blades about their longitudinal axes comprising a gear sleeved to said shaft, a nut member, means whereby longitudinal movement of said nut member will effect rotation of said gear, a planetary gearing, and means carried by the planetary gearing to effect longitudinal movement of said nut member.

20. A propeller having blades, a shaft for rotating said blades, a hub carried by the shaft and receiving the inner ends of said blades, a plurality of intermeshing gears, one of said gears being mounted on the shaft, another of said gears being mounted on the hub, and another of said gears being mounted on said blades, and means for rotating said first-named gear for imparting movement to the other of said gears to vary the pitch of said blades.

In testimony whereof, I have hereunto signed my name.

VINCENT BENDIX.